US009147282B1

(12) United States Patent
Cote et al.

(10) Patent No.: US 9,147,282 B1
(45) Date of Patent: Sep. 29, 2015

(54) TWO-DIMENSIONALLY CONTROLLED INTUITIVE TOOL FOR POINT CLOUD EXPLORATION AND MODELING

(75) Inventors: Stephane Cote, Lac Beauport (CA); Renaud Gervais, Amos (CA); Yves Boivin, Quebec (CA)

(73) Assignee: Bentley Systems, Incorporated, Exton, PA (US)

( * ) Notice: Subject to any disclaimer, the term of this patent is extended or adjusted under 35 U.S.C. 154(b) by 133 days.

(21) Appl. No.: 13/618,842

(22) Filed: Sep. 14, 2012

Related U.S. Application Data

(63) Continuation-in-part of application No. 13/287,795, filed on Nov. 2, 2011.

(51) Int. Cl.
*G06T 15/50* (2011.01)

(52) U.S. Cl.
CPC .................................. *G06T 15/50* (2013.01)

(58) Field of Classification Search
None
See application file for complete search history.

(56) References Cited

U.S. PATENT DOCUMENTS

| | | | |
|---|---|---|---|
| 5,513,276 A | 4/1996 | Theodoracatos | |
| 5,988,862 A | 11/1999 | Kacyra et al. | |
| 8,078,396 B2 | 12/2011 | Meadow et al. | |
| 2006/0279630 A1* | 12/2006 | Aggarwal et al. | 348/143 |
| 2008/0238836 A1 | 10/2008 | Uchino et al. | |
| 2009/0103773 A1 | 4/2009 | Wheeler et al. | |
| 2009/0231327 A1 | 9/2009 | Minear et al. | |
| 2010/0144436 A1* | 6/2010 | Marks et al. | 463/36 |
| 2010/0207936 A1 | 8/2010 | Minear et al. | |
| 2010/0208981 A1 | 8/2010 | Minear et al. | |
| 2011/0115812 A1 | 5/2011 | Minear et al. | |
| 2011/0187704 A1 | 8/2011 | Chen et al. | |
| 2011/0187716 A1 | 8/2011 | Chen et al. | |
| 2011/0187723 A1 | 8/2011 | Chen et al. | |
| 2011/0194270 A1 | 8/2011 | Di Trapani et al. | |

OTHER PUBLICATIONS

"Bentley Descartes V8i (SELECTseries 2) Help," Bentley Systems, Incorporated, Jul. 16, 2010, pp. 1-53.
"MicroStation V8i (SELECTseries 2) Help," Bentley Systems, Incorporated, Jul. 8, 2010, Selected Pages pp. 1-77.
"MicroStation-AccuSnap Tech Note," Washington State Department of Transportation, Sep. 2, 2010, pp. 1-4.
U.S. Appl. No. 13/287,795, filed Nov. 2, 2011 by Stephane Cote et al. for a Technique for Enhanced Perception of 3-D Structure in Point Clouds, all pages.

* cited by examiner

*Primary Examiner* — Said Broome
(74) *Attorney, Agent, or Firm* — Cesari and McKenna, LLP

(57) ABSTRACT

In one embodiment, a flashlight virtual object is provided that has a field of view. Any portions of the representation that fall within the field of view of the flashlight virtual object are highlighted. The position and orientation of the flashlight virtual object is manipulated in three-dimensional (3-D) space using a pointing device that captures motion in two-dimensions, by translation of the flashlight virtual object about one or more of a plurality of user-selectable two-dimensional (2-D) planes, rotation of the flashlight virtual object about one or more of a plurality of user-selectable points, translation of the flashlight virtual object along, or parallel to, one or more of a plurality of user-selectable axis and/or automated movement to a nearest point.

25 Claims, 10 Drawing Sheets

TWO-DIMENSIONALLY CONTROLLED INTUITIVE TOOL FOR POINT CLOUD EXPLORATION AND MODELING

RELATED APPLICATIONS

The present application is a continuation-in-part of U.S. patent application Ser. No. 13/287,795 filed on Nov. 2, 2011 by Stéphane Côté et al., titled "Technique for Enhanced Perception of 3-D Structure in Point Clouds", the contents of which are incorporated by reference herein in their entirety.

BACKGROUND

1. Technical Field

The present disclosure relates to techniques for manipulating a virtual tool in three-dimensional (3-D) space, and more specifically to techniques for manipulating a virtual tool in 3-D space with a pointing device that only captures motion in two-dimensions.

2. Background Information

Three-dimensional (3-D) laser scanners are increasingly being used to accurately and quickly capture the shape of physical subjects, such as discrete objects, portions of structures, terrain, or other parts of the physical environment. Such scanners capture a point cloud of geometric samples on the surface of the subject. To accomplish this task, a 3-D laser scanner typically emits some form of coherent light and detects its reflection from the surface of the physical subject. Some 3-D laser scanners rely on time-of-flight. In a time-of-flight 3-D laser scanner, a laser emits pulses of coherent light in a grid-like pattern to scan the physical subject. A laser rangefinder finds the distance to the surface of the physical subject for each pulse of coherent light by timing the round-trip-time of the pulse of light, from its emission, to its reflection back to the laser rangefinder. Other 3-D laser scanners rely on some form of triangulation Like a time-of-flight 3-D laser scanner, a triangulation 3-D laser scanner also emits coherent light in a grid-like pattern to scan the physical subject. However, rather than measure time-of flight, an offset camera is employed to look for the location where the coherent light strikes the subject (i.e. a laser dot). Depending on how far away the coherent light strikes the surface, the laser dot appears at different places in the camera's field of view, which can be used in a triangulation calculation to determine distance.

In either case, a point cloud of geometric samples is produced by repeated application of the technique, where each point of the point cloud is associated with a particular x-axis, y-axis and z-axis position on the surface of the physical subject. The points of the point cloud can be used to extrapolate the shape of the physical subject, which may be translated into a more readily used form through a reconstruction process. In reconstruction, the points of the point cloud are often used to construct a vector-based model, where the subject is represented by vector elements based on mathematical formulas, rather than on a large number of discrete points. Creating a vector-based model from a point cloud is generally a difficult process that requires at least some user-involvement in selecting which points of the point cloud should be used as the basis for vector elements. A user may be shown a rendition of the point cloud on a display of a computer system. He or she may then be called upon to "draw" vector elements (e.g., lines, polygons, etc.) using points of the point cloud as a guide. To "draw" vector elements, a user may be required to select and "snap" to a first point of the point cloud. The user may then select one or more other points that are "snapped" to. Collectively, the "snapped" to points may define the bounds of the vector element, with the x-axis, y-axis and z-axis position in 3-D space of the "snapped" to points assigned to the relevant portions of the vector element.

Unfortunately, there are a number of issues that complicate reconstruction. When displayed on a display screen, a point cloud typically appears completely flat. While each point in the point cloud may represent data at a different distance in 3-D space from a viewing position in the 3-D space, when displayed on a display screen, most systems show the points without perspective effects, and therefore they are all represented by dots of the same size. Absent visual depth information, a user is generally unable to discern how far away from the viewing position a point is in 3-D space, without time-consuming additional operations, and therefore may have difficulty selecting the appropriate points.

Further, point clouds are often discontinuous. Points that visually appear proximate to each other on a display screen may not be part of the same surface in 3-D space, but may instead be derived from surfaces in that simply happen to be aligned with respect to the viewing position in 3-D space. A point from a deeper surface may be shown next to a point from a closer surface, simply because those surfaces "overlap" when viewed from a certain perspective. Accordingly, a user generally is unable to definitively determine whether two points are part of the same surface or are parts of different surfaces, without time-consuming additional operations, and therefore may have difficulty selecting the appropriate points.

Finally, the points of a point cloud are arranged in 3-D space while the typical pointing device (e.g., mouse, touchpad, trackball, etc.) provided with electronic devices only captures motion in two-dimensions (herein referred to as a "2-D pointing device"). Even if a user knows the appropriate point to select in a point cloud, the user may be hindered from selecting the point using a 2-D pointing device due to the lack of an effective way to navigate in 3-D space. While a number of specialty 3-D pointing devices (e.g., 3-D pens, gyroscopic mice, etc.) are available that may capture motion in three dimensions, such specialty pointing devices are not widely deployed.

Accordingly, there is a need for improved techniques that address the shortcomings of the prior art.

SUMMARY

In one embodiment, the shortcomings of the prior art are addressed by a virtual tool based on a flashlight paradigm, and a technique for manipulating the virtual tool in 3-D space with a 2-D pointing device. The technique may provide for translation of the virtual tool about one or more of a plurality of user-selectable 2-D planes, rotation of the virtual tool about one or more of a plurality of user-selectable points, translation of the virtual tool along or parallel to one or more of a plurality of user-selectable axis and/or automated movement to a portion (e.g., point) of a representation (e.g., point cloud).

The virtual tool based on a flashlight paradigm (herein referred to as the "flashlight virtual object") produces highlighting effects upon points of a representation (e.g., a point cloud) within a specific field of view, such that it appears to emit a stream of light in the manner of a physical flashlight. The user may manipulate the position and orientation of the flashlight virtual object in the 3-D space of the representation (e.g., point cloud). As this occurs, the highlighted points may change in near-real time, thereby simulating the behavior of a physical flashlight moving in relation to physical objects. The highlighting effects provide a visual indication of depth and surface continuity to a user viewing a representation in a user interface on, for example, a 2-D display screen. The flashlight virtual object may include an integrated target (e.g., a snap target) that may be utilized by the user to select, and in some implementations "snap" to a portion (e.g., point) of the representation (e.g., the point cloud) whose depth and surface membership have been visually indicated by the highlighting effects.

The position and orientation of the flashlight virtual object may be manipulated with a 2-D pointing device. One of a plurality of user-selectable 2-D planes in the 3-D space of the representation (e.g., point cloud) may be selected. A first user-selectable 2-D plane may be normal to an axis extending through a body of the flashlight virtual object. A second user-selectable 2-D plane may be parallel to the display screen through which the user views the representation (e.g., point cloud). Movement of the 2-D pointing device may then be mapped to translation of the flashlight virtual object in the selected 2-D plane.

One of a plurality of user-selectable points in the 3-D space of the representation (e.g., point cloud) may be selected. A first user-selectable point may be located at a distal end (i.e., the tip) of the body of the flashlight virtual object. A second user-selectable point may be located at a proximal end (i.e., the back) of the body of the flashlight virtual object. Movement of the 2-D pointing device may then be mapped to rotation about the selected point.

Further, one of a plurality of user-selectable axis in the 3-D space of the representation (e.g., point cloud) may be selected. A first user-selectable axis may be the axis extending through the body of the flashlight virtual object. A second user-selectable axis may be an x-axis of a coordinate system used with the representation (e.g., the point cloud). A third user-selectable axis may be a y-axis of the coordinate system used with the representation (e.g., the point cloud). A fourth user-selectable axis may be the z-axis of the coordinate system used with the representation (e.g., the point cloud). An input action (e.g., scrolling a wheel) may be mapped to translation of the flashlight virtual object along, or parallel to, the selected axis. Movement may be accelerated in certain circumstances (e.g., in response to an input action).

Further, movement may be automated to move the flashlight virtual object to a nearest portion (e.g., point) of the representation (e.g., point cloud). The nearest portion may be within a cone extending from a distal end of the body of the flashlight virtual object. The flashlight virtual object may be effectively "teleported" to the nearest portion located within the cone.

BRIEF DESCRIPTION OF THE DRAWINGS

The detailed description below refers to the accompanying drawings of example embodiments, of which.

DETAILED DESCRIPTION

Figure 1:
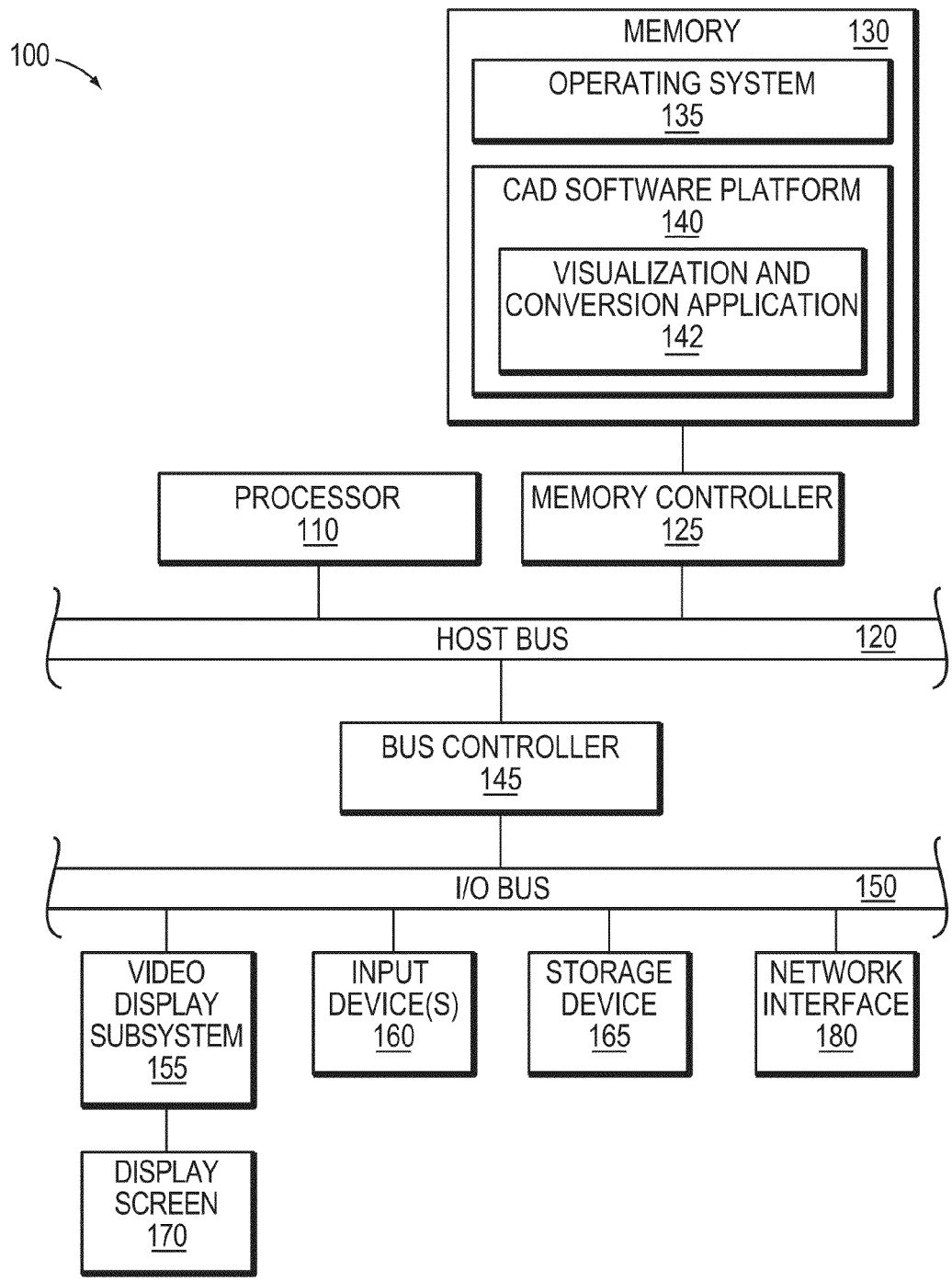
FIG. 1 is a block diagram of an example electronic device (e.g., a computer), in which at least some of the presently described techniques may be employed.

FIG. 1 is a block diagram of an example electronic device 100, (e.g., a computer), in which at least some of the presently described techniques may be employed. The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM), is coupled to the host bus 120 via a memory controller 125. The memory 130 is configured to store at least a portion of computer-executable instructions and data for an operating system 135 while the electronic device 100 is operating. In addition, the memory 130 may store at least portions of a computer aided design (CAD) software platform 140 on which a wide variety of task-specific applications may be based. The CAD software platform 140 may provide base functionality relating to object management, geometric relationships, information and standards management, visualization, drawing and report extraction, and the like. In one embodiment, the CAD software platform is the MicroStation® V8i CAD software platform, available from Bentley Systems Inc. A number of task-specific applications, including a visualization and conversion application 142 that includes functionality and tools for raster-to-vector conversion, may provide additional functionality leveraging the base functionality of the CAD software platform 140. In one embodiment, the visualization and conversion application 142 is the Bentley® Descartes visualization and conversion application, available from Bentley Systems Inc.

The host bus 120 of the electronic device 100 is coupled to an input/output (I/O) bus 150 through a bus controller 145. A video display subsystem 155 may include a display screen 170, such as a 2-D display screen, and hardware to drive the display screen. The video display subsystem 155 is coupled to the I/O bus 150. The display screen 170, among other functions, may show a user interface of the visualization and conversion application 142. One or more input devices 160 are provided and used for interaction with the electronic device 100, and the visualization and conversion application 142 executing on the electronic device. The input devices 160 may include a 2-D pointing device (e.g., a mouse, touchpad, trackball, etc.) that captures 2-D motion along a plane, but is incapable of directly capturing 3-D motion. The 2-D pointing device may also be capable of receiving input actions (e.g., key-presses, button-presses, scrolls, etc.). The input devices 160 may also include one or more other types of devices (e.g., keyboards, stand-alone controls, etc.) that are configured to receive input actions (e.g., key-presses, button-presses, scrolls etc.).

A persistent storage device 165, such as a hard disk drive, a solid-state drive, or other type or persistent data store, is coupled to the I/O bus 150, and may persistently store computer-executable instructions and data, that are available to be loaded to the volatile memory 130 when needed. For example, computer-executable instructions and data for the operating system 135, and the CAD software platform 140, and the visualization and conversion application 142, may be stored in the persistent storage device 165. The I/O bus 150 may further be coupled to a network interface 180 that interfaces with a computer network (not shown). The computer network may allow communication between the electronic device 100 and other devices, using any of a number of well known networking protocols, including wireless networking protocols, to permit a variety of discs tributed, collaborative or remote computing configurations.

A user may utilize a user interface of the above mentioned visualization and conversion application 142 to view on the display screen 170 a representation, e.g., a point cloud. The point cloud may be composed of geometric samples descriptive of the shape of a physical subject, such as a discrete object, portions of a structure, terrain, or other parts of the physical environment. The geometric samples may be captured by a 3-D laser scanner or other device. Using the point cloud as a starting point, the user may utilize one or more tools provided in the user interface to reconstruct a vector-based model that may be more readily utilized by applications of the CAD software platform 140. According to a semi-automated approach, the user may use the one or more tools to "snap" to selected points in the point cloud and "draw" vector elements.

According to an embodiment of the present disclosure, a special tool comprising a flashlight virtual object may be provided within the user interface of the visualization and conversion application 142. The flashlight virtual object may produce highlighting effects upon points of a point cloud within a specific field of view, such that it appears to emit a stream of light in the manner of a physical flashlight. The user may manipulate the position and orientation of the flashlight virtual object in the 3-D space. As this occurs, the highlighted points may change in near-real time, thereby simulating the behavior of a physical flashlight moving in relation to physical objects. The highlighting may provide a visual indication of depth and surface continuity. The flashlight virtual object may also include a snap target that may be utilized to select a point of the point cloud whose depth and surface membership have been visually indicated by the highlighting effects. Using the input device, for example, clicking a button of the 2-D mouse, the user may "snap" to a point of the point cloud located proximate the snap target, to begin "drawing" a vector element. One or more additional points may be selected in similar manner to define the further extent of the vector element.

Figure 2:
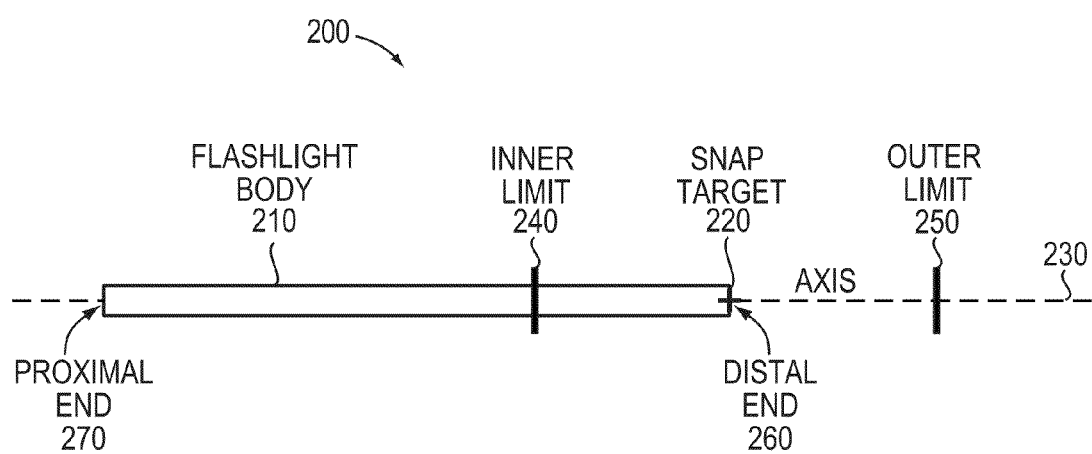
FIG. 2 is a schematic diagram of an example flashlight virtual object that may be provided within the user interface of the visualization and conversion application.

FIG. 2 is a schematic diagram of an example flashlight virtual object 200 that may be provided within the user interface of the visualization and conversion application 142. The flashlight virtual object 200 includes a body 210. A snap target 220 may be located at the distal end (e.g. the tip) 260 the body 210 along an axis 230, remote from a proximal end (e.g. the rear) of the body 210. In alternative implementations, the snap target 220 may be differently located, for example located some distance forward from the distal end 260 of the body. The body 220 may be graphically displayed within the user interface as an icon reminiscent of a physical flashlight. In alternative implementations, the body 220 may be differently represented. The snap target 230 may be graphically disco played within the user interface, for example, as a small sphere. In alternative implementations, a different representation, or no representation may be provided. When the flashlight virtual object is positioned proximate to points of a point cloud within the user interface of the visualization and conversion application 142, highlighting effects are imposed upon points within a field of view, such that it appears that a stream of light is being emitted upon points within the field of view. The field of view is disposed generally along the axis 230, between an inner limit 240 and an outer limit 250.

While the field of view may be shaped in a variety of different manners, in one embodiment, the field of view is shaped as a pair of cones. An inner cone of the pair may have its base at the inner limit 240 and its apex at the snap target 220. An outer cone of the pair may have its base at the outer limit 250 and its apex at the snap target 220. The axis of both cones may be aligned along the axis 230 of the flashlight virtual object 200.

Figure 3:
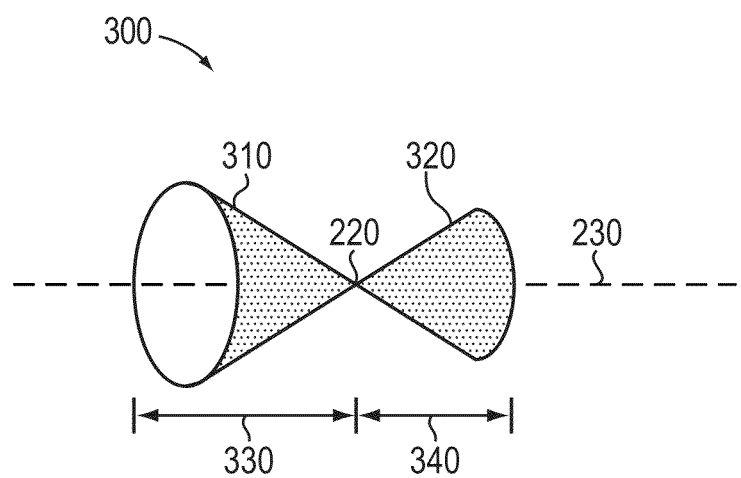
FIG. 3 is a schematic diagram of an example field of view of the example flashlight virtual object, where the field of view is shaped as a pair of cones.

FIG. 3 is a schematic diagram of an example field of view 300 of the example flashlight virtual object 200, where the field of view 300 is shaped as a pair of cones. The inner cone 310 is characterized by a height 330 from the inner limit to the snap target 220 and encloses an inner zone. The outer cone 320 is characterized by a height 340 from the outer limit to the snap target 220 and encloses an outer cone. Each cone may have an identical opening angle (θ) (see FIG. 4), or, in some implementations, different opening angles.

Figure 4:
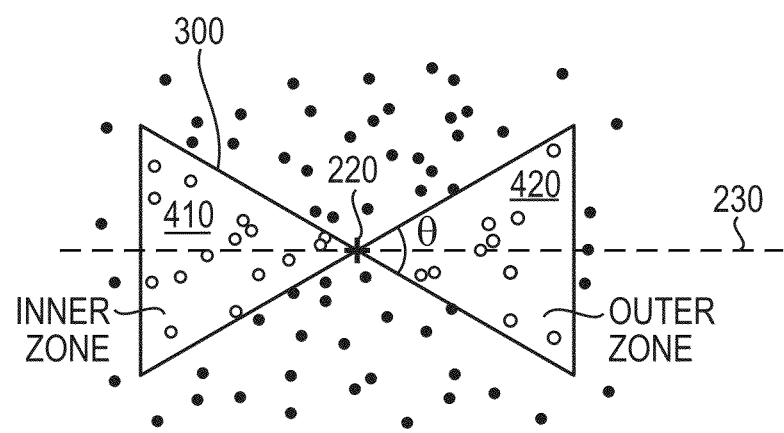
FIG. 4 is a schematic diagram of a cross section of an example field of view of the example flashlight virtual object, shown disposed among points of a point cloud.

FIG. 4 is a schematic diagram of a cross section of an example field of view 300 of the example flashlight virtual object, shown disposed among points of a point cloud. When the flashlight virtual object is activated within the user interface of the visualization and conversion application 142, all points of the point cloud which fall within the inner zone 410 (defined by the inner cone 310) may be highlighted with a first color ($C_i$), for example, by changing a pixel color assigned to the points. All points of the point cloud which fall within the outer zone 420 (defined by the outer cone 320) may be highlighted with a second color ($C_o$) in similar manner. In one implementation, the first color ($C_i$) is red and the second color ($C_o$) is green. Alternatively, the first color ($C_i$) and second color ($C_o$) may be any of a variety of other colors, including the same color. As the user moves the flashlight virtual object within the point cloud, the points of the point cloud that fall within the two enclosed zones 410, 420 change. As this occurs, the points of the point cloud that are highlighted are updated in substantially real-time, to approximate the appearance of a real flashlight being moved while shining upon among real objects.

As the user changes the position and orientation of the flashlight virtual object, the snap target 220 may approach, and eventually move across, a surface (or surfaces) represented by points in the point cloud. As the flashlight virtual object approaches the surface, the outer cone 320 may intersect the surface and points on the surface within the outer zone 420 may be highlighted with the second color ($C_o$), e.g., green. This may create the effect of a highlighted "spot" being displayed. If the user moves the flashlight virtual object closer to the surface, such that the snap target approaches the surface, the portion of the surface intersected by the outer cone will become smaller and smaller, given the decreasing cross section of the outer cone 320 being intersected. Therefore, the highlighted "spot" on the surface will decrease in size. Eventually, when the surface passes through the snap target 220, the highlighted "spot" will disappear, as no points on the surface fall within either the outer or inner zones. If the user makes a snap selection when the "spot" has disappeared, a point on the surface closest to the snap target 220 will be snapped to. If the user moves the flashlight virtual object further forward, such that the snap target 220 is disposed beyond the surface, the inner cone 310 may intersect the surface and points on the surface within the inner zone 410 may be highlighted with the first color ($C_i$), e.g., red. Again, a highlighted "spot" may be displayed, increasing in size as the flashlight virtual object is moved further forward. In this manner, a visual display may be produced that conveys depth and surface continuity information to the user, allowing the user to select a desired point and "snap" to it.

Figure 5:
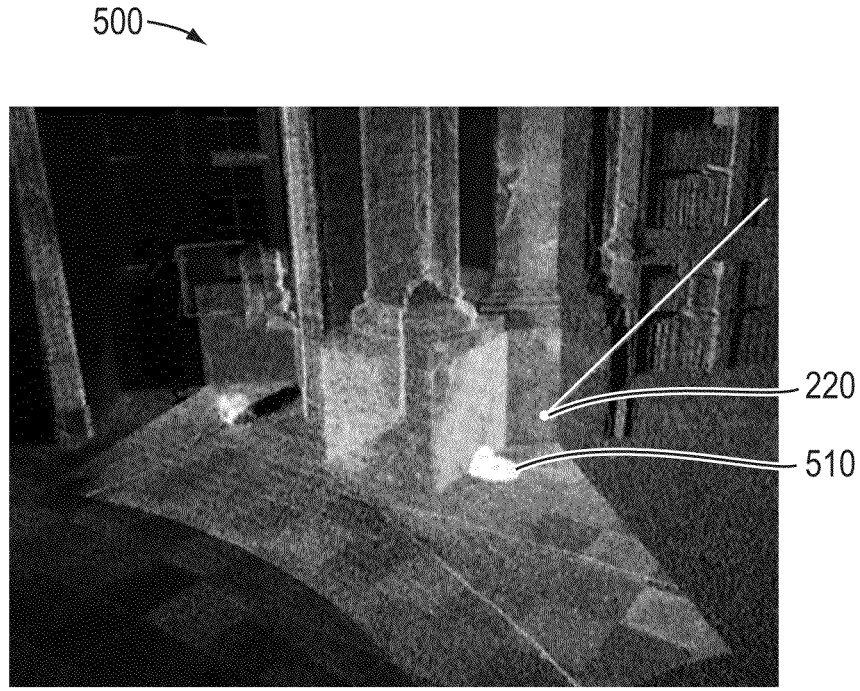
FIG. 5 is screen shot of an example flashlight virtual object approaching surfaces within an example point cloud representing the interior of a structure.

FIG. 5 is a screen shot 500 of an example flashlight virtual object 200 approaching surfaces within an example point cloud representing the interior of a structure. A user may change position and orientation of the flashlight virtual object to bring the flashlight virtual object towards the surface. As this occurs, and the snap target 220 approaches the surface, a highlighted "spot" 510 is displayed. In this example, points that define a portion of a floor and a column (which collectively form surfaces) are highlighted. The user may, with the input device 160, move the flashlight virtual object 200 closer such that the highlighted "spot" will decrease in size and eventually disappear as the snap target intersects the surfaces. If the user makes a snap selection at that moment, a point on the surface closest to the snap target 220 will be snapped to, in this example, a point on the floor near that base of the column. If the user changes the position of the flashlight virtual object so it is further forward, a highlighted "spot" again may be displayed, increasing in size as the flashlight virtual object is moved further forward.

Figure 6:
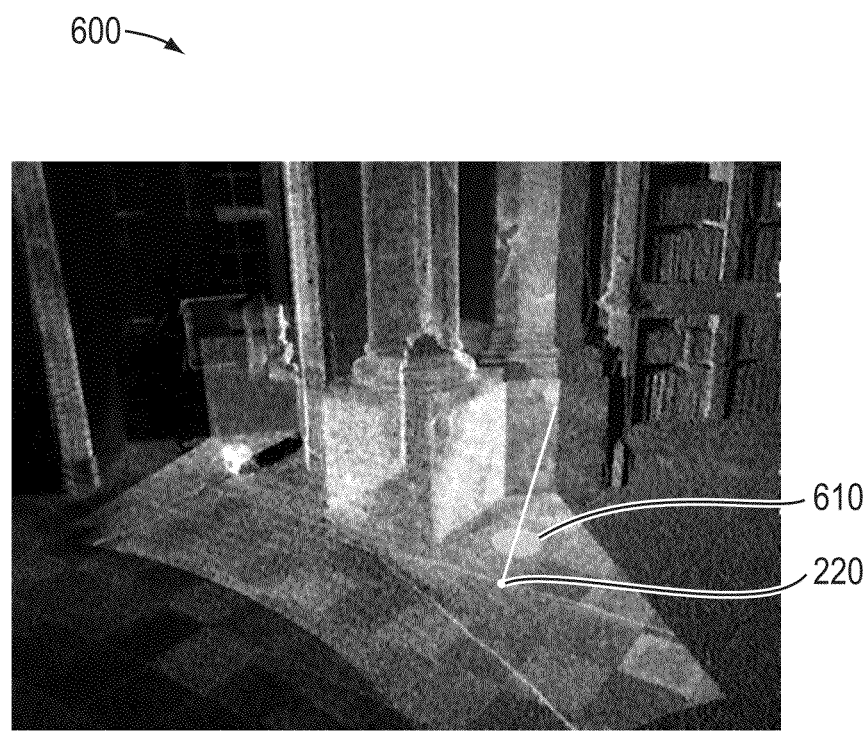
FIG. 6 is a screen shot of the example flashlight virtual object passing a surface within the example point cloud of FIG. 5.
Figure 7:
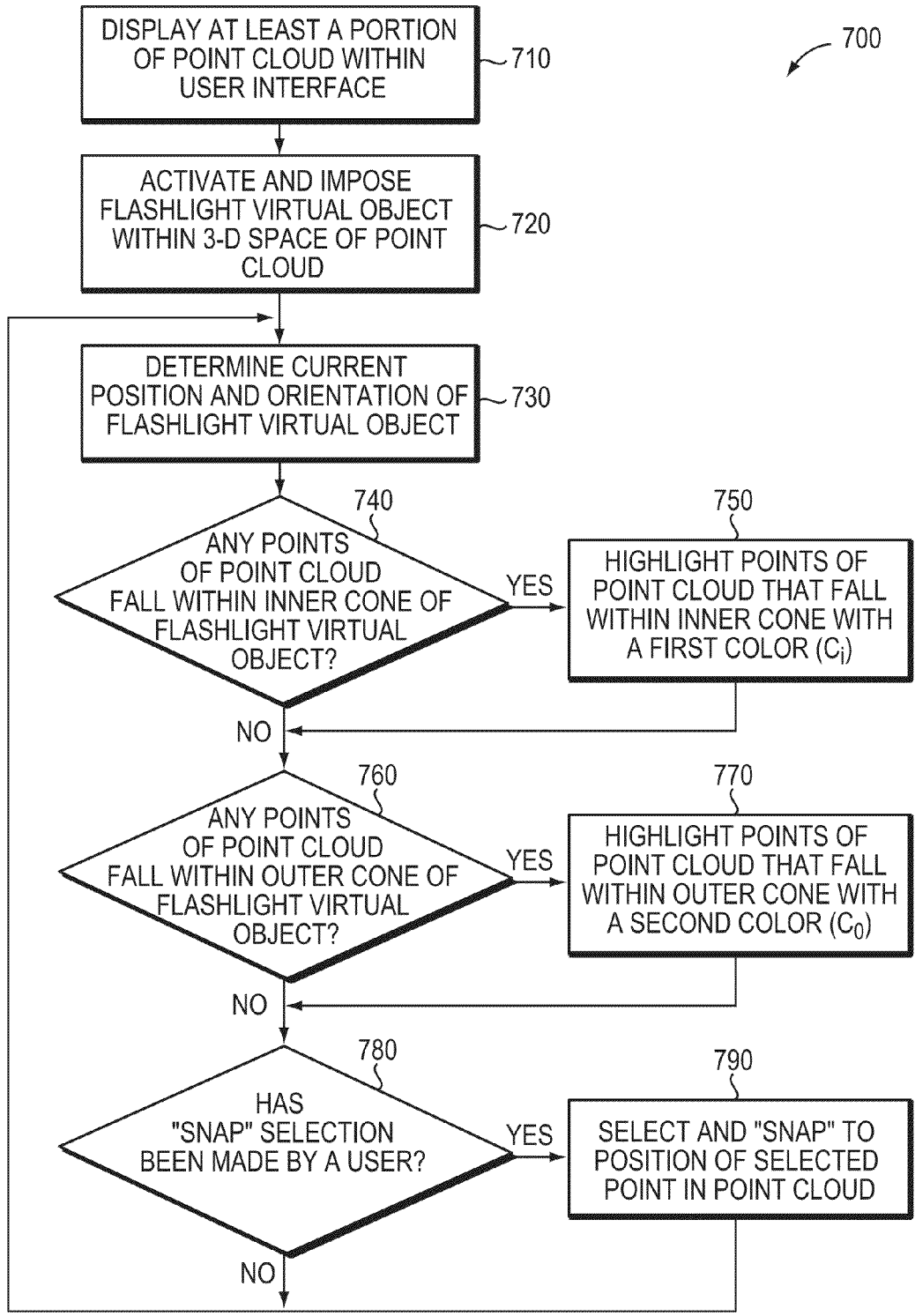
FIG. 7 is an example sequence of steps for enhancing a user's perception of the three dimensional structure of points in a point cloud.

FIG. 6 is a screen shot 600 of the example flashlight virtual object passing a surface within the example point cloud of FIG. 5. As the occurs, and the snap target 220 passes further beyond the surface, a highlighted "spot" 610 is again displayed. In this example, points that define a portion of the floor are highlighted. A differing color of this highlighted spot (e.g., red as opposed to green) may help signal to the user that he or she has passed through the surface. In this manner a user may rapidly perceive when the snap target 220 is moved to the desired "snapping" depth, as well as surface continuity information FIG. 7 is an example sequence of steps 700 for enhancing a user's perception of the three dimensional structure of points in a point cloud. At step 710, at least a portion of the point cloud is displayed on the display screen 170 within the user interface of the visualization and conversion application 142. Each point of the point cloud is associated with a position in 3-D space. At step 720, a flashlight virtual object is activated and imposed within the 3-D space of the point cloud being displayed within the user interface of the visualization and conversion application 142. At step 730, a current position and orientation of the flashlight virtual object 200 is determined within the 3-D space. At step 740 a determination is made whether any points of the point cloud fall within an inner cone of the flashlight virtual object 200, the inner cone having its base at an inner limit 240 and its apex at a snap target 220. If so, at step 750 points of the point cloud which fall within the inner zone 410 are highlighted with a first color ($C_i$). At step 760 a determination is made whether any points of the point cloud fall within an outer cone of the flashlight virtual object 200, the outer cone having its base at an outer limit 250 and its apex at a snap target 220. If so, at step 770 points of the point cloud which fall within the outer zone 420 are highlighted with a second color ($C_o$). At step 780 a determination is made whether a "snap" selection has been made by a user. At step 790, if so, a point closest to the snap target 220 will be "snapped" to, the position of the point to be used as the position of a portion of a vector element, for example, as the position for the beginning or the ending of a line. Steps 730-790 may be repeated, with the user changing the position and orientation the flashlight virtual object to examine the point cloud and select and "snap" to additional points.

In order to change the position and orientation of the flashlight virtual object in 3-D space using a 2-D pointing device, a technique may be employed that provides for translation of the flashlight virtual object about one or more of a plurality of user-selectable 2-D planes, rotation of the flashlight virtual object about one or more of a plurality of user-selectable points, translation of the flashlight virtual object along, or parallel to, one or more of a plurality of user-selectable axis and/or automated movement to a nearest point.

Figure 8:
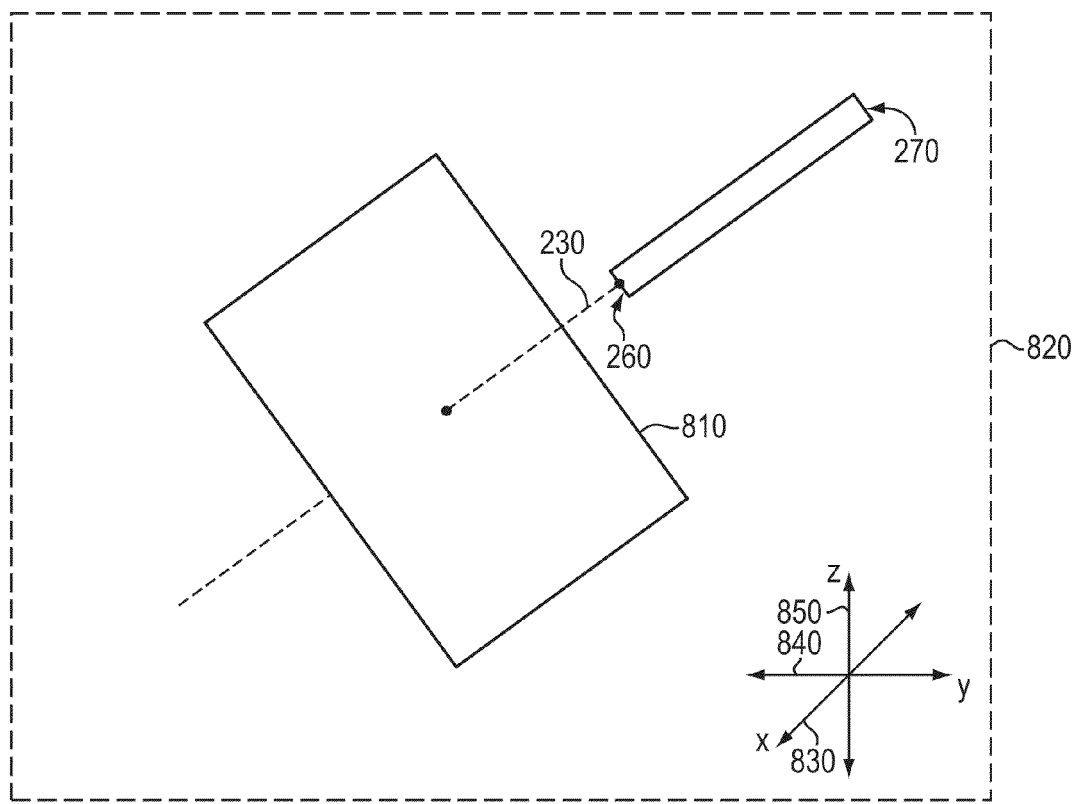
FIG. 8 is a schematic diagram depicting the example flashlight virtual object as well as user-selectable 2-D planes, user-selectable points and user-selectable axis.

FIG. 8 is a schematic diagram depicting the example flashlight virtual object in relation to example user-selectable 2-D planes 810, 820, user-selectable points 260, 270 and user-selectable axis 230, 830, 840, 850. A first user-selectable 2-D plane 810 is normal to the axis 230 extending through the body 210 of the flashlight virtual object. A second user-selectable 2-D plane 820 is parallel to the surface of the display screen 170 on which the user views a point cloud. A first user-selectable point may be located at the distal end (i.e. the tip) 260 of the body 210 of the flashlight virtual object. A second user-selectable point may be located at the proximal end (i.e., the back) 270 of the body 210 of the flashlight virtual object. A first user-selectable axis may be the axis 230 extending through the body 210 of the flashlight virtual object. A second user-selectable axis may be the x-axis 830 of a coordinate system used with the point cloud. A third user-selectable axis may be the y-axis 840 of the coordinate system used with the point cloud. A fourth user-selectable axis may be the z-axis 850 of the coordinate system used with the point cloud.

Figure 9:
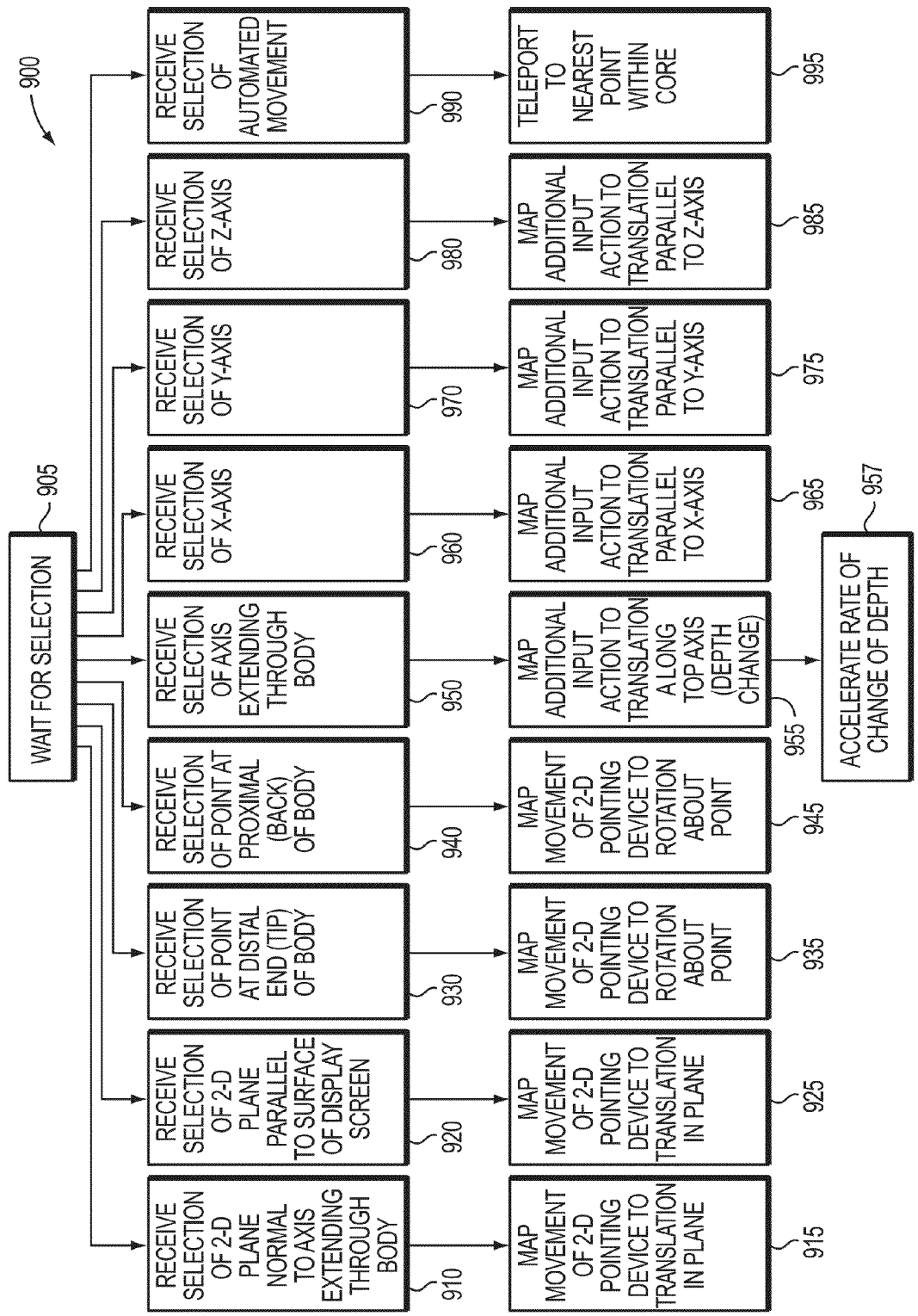
FIG. 9 is an example sequence of steps for changing the position and orientation of the flashlight virtual object in 3-D space using a 2-D pointing device.

FIG. 9 is an example sequence of steps 900 for changing the position and orientation of the flashlight virtual object in 3-D space using a 2-D pointing device. At step 905, the electronic device 100 waits for a selection, for example via an input action (e.g. a key-press, button-press, scroll wheel action, etc.), or lack thereof. From the input action, or lack thereof, it may be determined whether the user desires to translate the flashlight virtual object about one or more of the plurality of user-selectable 2-D planes via step 910 or 920, rotate of the flashlight virtual object about one or more of the plurality of user-selectable points via step 930 or 940, translate the flashlight virtual object along one or more of the plurality of user-selectable axis via step 950, 960, 970, or 980, or automatically move to a nearest point via step 990.

At step 910, a selection is received of the first user-selectable 2-D plane 810 that is normal to the axis 230 extending through the body 210 of the flashlight virtual object. In one specific implementation, the selection may be made as a default action, which is triggered when the 2-D pointing device is moved but no key on a keyboard of the electronic device 100 is pressed. Thereafter, at step 915, movement of the 2-D pointing device is mapped to a corresponding translation of the flashlight virtual object in the plane 810.

At step 920, a selection is received of the second user-selectable 2-D plane 820 that is parallel to the surface of the display screen 170 on which the user views the point cloud. In one specific implementation, the selection may be indicated by an input action (e.g., a key-press, button-press, etc.), or more specifically, holding the "A" key on a keyboard of the electronic device 100. Thereafter, at step 925, movement of the 2-D pointing device is mapped to a corresponding translation of the flashlight virtual object in the plane 820.

At step 930, a selection is received of the first user-selectable point 260 located at the distal end (i.e., the tip) 260 of the body 210 of the flashlight virtual object. In one specific implementation, the selection may be indicated by an input action (e.g., a key-press, button-press, etc.), or more specifically, holding the "C" key on the keyboard of the electronic device 100. Thereafter, at step 935, movement of the 2-D pointing device is mapped to a corresponding rotation of the flashlight virtual object about the point 260.

At step 940, a selection is received of the second user-selectable point 270 located at the proximal end (i.e., the back) 270 of the body 210 of the flashlight virtual object. In one specific implementation, the selection may be indicated by an input action (e.g., a key-press, button-press, etc.), or more specifically, holding the "B" key on the keyboard of the electronic device 100. Thereafter, at step 945, movement of the 2-D pointing device is mapped to a corresponding rotation of the flashlight virtual object about the point 270.

At step 950, a selection is received of the axis 230 extending through the body 210 of the flashlight virtual object. In one specific implementation, the selection may be made as a default action, which is triggered when an additional input action (e.g., movement of a scroll wheel) is detected, but no key on keyboard of the electronic device 100 is pressed. Thereafter, at step 955, the additional input action (e.g., movement of the scroll wheel) may be mapped to a corresponding translation of the flashlight virtual object along the axis 230. This may effectively change the depth of the flashlight virtual object. At step 957, a rate of change of the depth may be accelerated. In one specific implementation, the acceleration may be performed in response to an input action (e.g., a key-press, button-press, etc.), or more specifically, holding the "D" key on the keyboard of the electronic device 100, while performing the additional input action (e.g., moving the scroll wheel) to translate the flashlight virtual object along the axis 230.

At step 960, a selection is received of the x-axis 830 of the coordinate system used with the point cloud. In one specific implementation, the selection may be indicated by an input action (e.g. a key-press, button-press, etc.), or more specifically, holding the "E" key on a keyboard of the electronic device 100. Thereafter, at step 965, an additional input action (e.g., movement of a scroll wheel) may be mapped to a corresponding translation of the flashlight virtual object parallel to the x-axis 830.

At step 970, a selection is received of the y-axis 840 of the coordinate system with used the point cloud. In one specific implementation, the selection may be indicated by an input action (e.g., a key-press, button-press, etc.), or more specifically, holding the "F" key on a keyboard of the electronic device 100. Thereafter, at step 975, an additional input action (e.g., movement of a scroll wheel) may be mapped to a corresponding translation of the flashlight virtual object parallel to the y-axis 840.

At step 980, a selection is received of the z-axis 850 of the coordinate system used with the point cloud. In one specific implementation, the selection may be indicated by an input action (e.g. a key-press, button-press, etc.), or more specifically, holding the "G" key on a keyboard of the electronic device 100. Thereafter, at step 985, an additional input action (e.g., movement of a scroll wheel) may be mapped to a corresponding translation of the flashlight virtual object parallel to the z-axis 850.

At step 990, a selection is received of automated movement to a nearest point in the point cloud. The nearest point may be a nearest point within a cone extending from the distal end 260 of the body 210 of the flashlight virtual object. In one specific implementation, the selection of automated movement may be indicated by an input action (e.g., a key-press, button-press, etc.), or more specifically, a press of the "H" key on a keyboard of the electronic device 100. In response, at step 995, the flashlight virtual object may be effectively "teleported" to the nearest point located within the cone.

Figure 10:
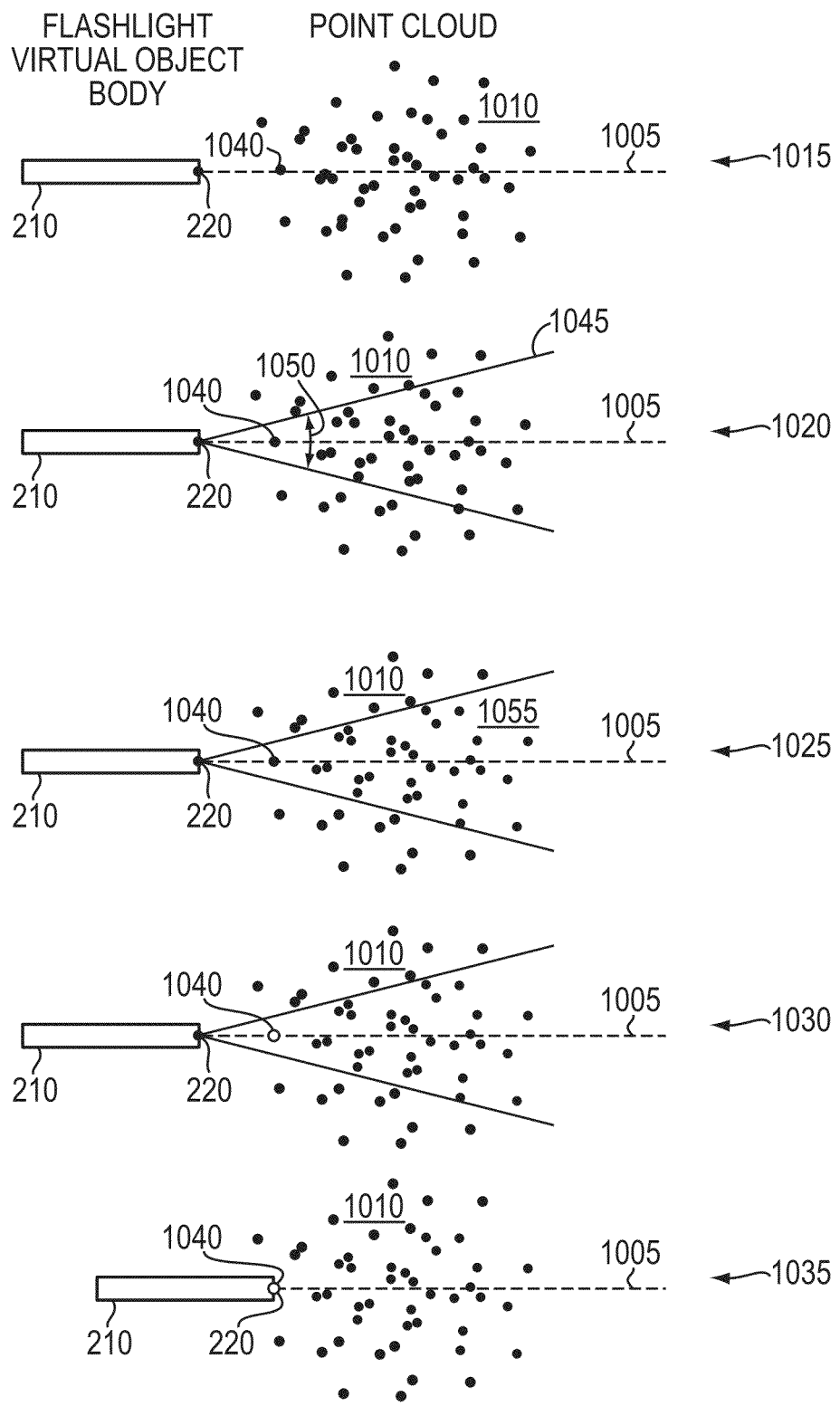
FIG. 10 is a progression of schematic diagrams that illustrate automated movement of the flashlight virtual object to a nearest point of the point cloud.

FIG. 10 is a progression of schematic diagrams 1015, 1020, 1025, 1030, 1035 that illustrate automated movement of the flashlight virtual object to a nearest point of the point cloud 1010. In frame 1015, the body 210 and snap target 220 of the flashlight vires tual object are initially remote from points of the point cloud 1010, including point 1040 disposed near to axis 1005. In frame 1020, a cone 1045 having an opening angle 1050 (e.g., 30°), and extending from the distal end of the body 220, may be projected upon the point cloud 1010. The cone 1045 may not be shown to the user, and simply used for computational purposes. In frame 1025, a set of points 1055 within the cone 1045 are identified. In frame 1030, a nearest point to the body 210 within the set of points 1055 is identified. Here, the nearest point is the point 1040 disposed near to axis 1005. However, it should be understood that the nearest point may be located more distant than other points from the axis 1005, provided it is still nearest to the body 210. In some implementations, the point may be compared to a maximum distance, which indicates whether the point is acceptably near. The maximum distance may be user defined. In frame 1035, the flashlight virtual object, and the snap target 220, is automatically translated to be at the point 1040. The orientation of the flashlight virtual object in 3-D space may remain the same. Thereafter, the user may select and "snap" to the point 1040, or perform some further change of position or orientation, according to the steps of FIG. 9.

While the above description discusses various embodiments of the present disclosure, it should be apparent that a number of modifications and/or additions may be made without departing from the disclosure's intended spirit and scope.

While much of the above description discusses an example where the flashlight virtual object 200 is used with a point cloud during a reconstruction process, it should be understood that the flashlight virtual object may be used to visually convey depth and surface continuity information for a variety of other types of representations, including representations that are not based on a collection of points. For example, the flashlight virtual object may alternatively be utilized with elements of a 3-D CAD model, triangles of a triangle-mesh of a terrain elevation model, or any of a variety of other types of representations that may be shown within a user interface of an application. In general, at least a part of a representation may be displayed and the flashlight virtual object activated and imposed within 3-D space of that part of the representation. A current position and orientation of the flashlight virtual object is determined within the 3-D space. A determination is made whether any portion of the representation falls within an inner zone of the flashlight virtual object 200, and, if so, that portion is highlighted with a first color ($C_i$). Similarly, a determination is made whether any portion of the representation falls within an outer zone of the flashlight virtual object 200 and, if so, that portion is highlighted with a second color ($C_o$). Further, a determination may be made whether a user has entered a selection. If so, an element (e.g., a point, a vector element, etc) closest to the snap target 220 may be selected and, in some cases, a position of that element returned. These operations may be repeated, with the user changing the position and orientation of the flashlight virtual object to examine the representation and, possibly, make selections.

While a number of specific examples of keys are discussed above that may be pressed as input actions when changing the position and orientation of the flashlight virtual object, it should be understood that such keys are merely examples. A wide variety of key-presses, button-presses, or other input may be used as the input actions. In general, the above techniques may be adapted to change the position and orientation of the flashlight virtual object in 3-D space using a 2-D pointing device in a variety of different manners.

While much of the above description discusses embodiments of the flashlight virtual object that include an integrated snap target, it should be understood that other embodiments may lack an integrated snap target. A snap target may simply not be provided, or may be provided by another object, separate from the flashlight virtual object. Similarly, other embodiments may include an integrated target of limited functionally. For example, a target may be provided that allows a user to select a point, but does not permit the user to "snap" some other type of element to that point.

While embodiments are discussed above in which the field of view 300 of the flashlight virtual object is shaped as a pair of cones, it should be understood that the field of view may be differently shaped. For example, the field of view may be shaped as a single cone, a pair of pyramids, a single pyramid or any of a variety of other shapes, while still achieving some or all of the above discussed advantages.

Furthermore, it should be understood that the above described techniques may be implemented in software, in hardware, or a combination thereof. A software implementation may include executable instructions that implement applications stored in a non-transitory computer-readable medium, such as a volatile or persistent memory device, a hard-disk, a compact disk (CD), etc. A hardware implementation may include processors, memory chips, programmable logic circuits, application specific integrated circuits, and/or other types of hardware components. Further, a combined software/hardware implementation may include both computer-executable instructions stored in a non-transitory computer-readable medium, as well as one or more hardware components. Accordingly, it should be understood that the above descriptions are meant to be taken only by way of example.

What is claimed is:

1. A method comprising:
   displaying a representation within a user interface on a display screen of an electronic device, each portion of the representation associated with a position in three-dimensional (3-D) space;
   imposing, by the electronic device, a flashlight virtual object within the 3-D space of the representation displayed within the user interface on the display screen, the flashlight virtual object having a field of view;
   determining whether any portions of the representation fall within the field of view of the flashlight virtual object, and, if so, highlighting those portions of the representation that fall within the field of view;
   receiving a selection of a user-selectable two-dimensional (2-D) plane to which movement of the flashlight virtual object is to be confined, the 2-D plane selected from among a plurality of user-selectable 2-D planes within the 3-D space of the representation; and
   in response to receiving the selection of the user-selectable 2-D plane, mapping a movement of a pointing device that captures motion in only two-dimensions to a corresponding translation of the flashlight virtual object confined within the selected 2-D plane to change a position of the flashlight virtual object in the 3-D space of the representation.

2. The method of claim 1, wherein the selected 2-D plane is a 2-D plane normal to an axis extending through a body of the flashlight virtual object.

3. The method of claim 1, wherein the selected 2-D plane is a 2-D plane parallel to a surface of the display screen.

4. The method of claim 1, further comprising:
   receiving a selection of a user-selectable point within the 3-D space of the representation; and
   in response to receiving the selection of the user-selectable point, mapping a movement of the pointing device that captures motion in only two-dimensions to a corresponding rotation of the flashlight virtual object about the selected point to change an orientation of the flashlight virtual object in the 3-D space of the representation.

5. The method of claim 4, wherein the selected point is a point located at a distal end of a body of the flashlight virtual object.

6. The method of claim 4, wherein the selected point is a point located at a proximal end of a body of the flashlight virtual object.

7. The method of claim 1, further comprising:
   receiving a selection of a user-selectable axis within the 3-D space of the representation; and
   in response to receiving the selection of the user-selectable axis, mapping a movement of the pointing device that captures motion in two-dimensions to a corresponding translation of the flashlight virtual object along the selected axis to change the position of the flashlight virtual object in the 3-D space of the representation.

8. The method of claim 7, wherein the selected axis is an axis extending through a body of the flashlight virtual object.

9. The method of claim 7, wherein the selected axis is an axis of a coordinate system used with the representation.

10. The method of claim 7, further comprising:
    accelerating a rate of translation in response to an input action.

11. The method of claim 1, further comprising:
    receiving a selection of automated movement; and
    automatically translating the flashlight virtual object to a nearest portion of the representation located within a view cone that extends from the flashlight virtual object.

12. A method comprising:
    displaying a representation within a user interface on a display screen of an electronic device, each portion of the representation associated with a position in three-dimensional (3-D) space;
    imposing, by the electronic device, a flashlight virtual object within the 3-D space of the representation displayed within the user interface on the display screen, the flashlight virtual object having a field of view;
    determining whether any portions of the representation fall within the field of view of the flashlight virtual object, and, if so, highlighting those portions of the representation that fall within the field of view;
    receiving a selection of a user-selectable two-dimensional (2-D) plane within the 3-D space of the representation from among a plurality of user-selectable 2-D planes; and
    in response to receiving the selection of the user-selectable 2-D plane, mapping a movement of a pointing device that captures motion in only two-dimensions to a corresponding translation of the flashlight virtual object in the selected 2-D plane to change a position of the flashlight virtual object in the 3-D space of the representation,
    wherein the representation is a point cloud, and each portion of the representation is a point.

13. The method of claim 1, wherein the field of view of the flashlight virtual object includes an inner zone shaped as a cone and an outer zone shaped as a cone, and the highlighting highlights those portions of the representation that fall within the inner zone and those portions of the representation that fall within the outer zone.

14. The method of claim 1, wherein the field of view of the flashlight virtual object includes an inner zone and an outer zone, and the highlighting highlights those portions of the representation that fall within the inner zone with a first color, and those portions of the representation that fall within the outer zone with a second, different color.

15. The method of claim 1, wherein the pointing device that captures motion in only two-dimensions is a mouse.

16. The method of claim 1, wherein the flashlight virtual object includes a target, and the method further comprises:
   selecting an element of the representation that is closest to the target; and
   returning a position of the selected element of the representation.

17. A non-transitory computer-readable medium that includes instructions executable on a processor, the instructions, when executed, operable to:
   display a representation on a display screen, each portion of the representation associated with a position in three-dimensional (3-D) space;
   impose a virtual tool within the 3-D space of the representation displayed on the display screen, the virtual tool having a field of view;
   determine whether any portions of the representation fall within the field of view of the virtual tool, and, if so, highlight those portions of the representation that fall within the field of view; and
   map a movement of the pointing device that captures motion in two-dimensions to a corresponding translation or rotation of the virtual tool in the 3-D space of the representation to manipulate the virtual tool in the 3-D space of the representation.

18. The non-transitory computer-readable medium of claim 17, wherein the instructions, when executed, are further operable to receive a selection of a user-selectable two-dimensional (2-D) plane within the 3-D space of the representation from among a plurality of user-selectable 2-D planes, and the instructions to map a movement of the pointing device that captures motion in two-dimensions are further operable to map the movement of the pointing device that captures motion in two-dimensions to a corresponding translation of the virtual tool in the selected 2-D plane to change a position of the virtual tool in the 3-D space of the representation.

19. The non-transitory computer-readable medium of claim 17, wherein the instructions, when executed, are further operable to receive a selection of a user-selectable point within the 3-D space of the representation, and the instructions to map a movement of the pointing device that captures motion in two-dimensions are further operable to map the movement of the pointing device that captures motion in two-dimensions to a corresponding rotation of the virtual tool about the selected point to change an orientation of the virtual tool in the 3-D space of the representation.

20. The non-transitory computer-readable medium of claim 17, wherein the instructions, when executed, are further operable to receive a selection of a user-selectable axis within the 3-D space of the representation, and the instructions to map a movement of the pointing device that captures motion in two-dimensions are further operable to map the movement of the pointing device that captures motion in two-dimensions to a corresponding translation of the virtual tool along the selected axis to change a position of the virtual tool in the 3-D space of the representation.

21. The non-transitory computer-readable medium of claim 20, wherein the instructions, when executed, are further operable to:
   accelerate a rate of translation in response to an input action.

22. The non-transitory computer-readable medium of claim 17, wherein the instructions, when executed, are further operable to:
   receive a selection of automated movement; and
   automatically translate the virtual tool to a nearest portion of the representation located within a view cone that extends from the virtual tool.

23. The non-transitory computer-readable medium of claim 17 wherein the representation is a point cloud and each portion of the representation is a point.

24. An apparatus, comprising:
   a pointing device that captures motion in two-dimensions;
   a display screen configured to display a user interface;
   a processor; and
   a memory coupled to the processor and configured to store instructions for an application that is executable on the processor, the instructions for the application, when executed, operable to:
      cause a representation to be displayed on the display screen, each portion of the representation associated with a position in three-dimensional (3-D) space,
      impose a flashlight virtual object within the 3-D space of the representation displayed on the display screen, the flashlight virtual object having a field of view,
      determine whether any portions of the representation fall within the field of view of the flashlight virtual object, and, if so, highlight those portions of the representation that fall within the field of view on the display screen, and
      map a movement of the pointing device that captures motion in two-dimensions to a corresponding translation or rotation of the flashlight virtual object in the 3-D space of the representation to manipulate the flashlight virtual object in the 3-D space of the representation.

25. A method comprising:
   displaying a point cloud within a user interface on a display screen of an electronic device, each point of the point cloud associated with a position in three-dimensional (3-D) space;
   imposing, by the electronic device, a virtual tool within the 3-D space of the point cloud displayed within the user interface on the display screen, the virtual tool object having a field of view;
   determining whether any points of the point cloud fall within the field of view of the virtual tool, and, if so, highlight those points of the point cloud that fall within the field of view;
   receiving a selection of a user-selectable two-dimensional (2-D) plane to which movement of the virtual tool is to be confined; and
   mapping a movement of a pointing device to a corresponding movement of the virtual tool confined within the selected 2-D plane to change a position of the flashlight virtual object in the 3-D space of the point cloud.

* * * * *

UNITED STATES PATENT AND TRADEMARK OFFICE
CERTIFICATE OF CORRECTION

| | | |
|---|---|---|
| PATENT NO. | : 9,147,282 B1 | Page 1 of 1 |
| APPLICATION NO. | : 13/618842 | |
| DATED | : September 29, 2015 | |
| INVENTOR(S) | : Stéphane Côté et al. | |

It is certified that error appears in the above-identified patent and that said Letters Patent is hereby corrected as shown below:

In the Specification:

Col. 5, line 15 should read:
protocols, to permit a variety of distributed, collaborative Col. 5, line 66 should read:
displayed within the user interface, for example, as a small Col. 10, line 7 should read:
flashlight virtual object are initially remote from points of Signed and Sealed this
Seventeenth Day of May, 2016

Michelle K. Lee
*Director of the United States Patent and Trademark Office*